(12) United States Patent
Uchiyama

(10) Patent No.: US 8,038,353 B2
(45) Date of Patent: Oct. 18, 2011

(54) WHEEL BEARING APPARATUS FOR A VEHICLE

(75) Inventor: Nobukatsu Uchiyama, Iwata (JP)

(73) Assignee: NTN Corporation (JP)

( * ) Notice: Subject to any disclaimer, the term of this patent is extended or adjusted under 35 U.S.C. 154(b) by 31 days.

(21) Appl. No.: 12/627,203

(22) Filed: Nov. 30, 2009

(65) Prior Publication Data

US 2010/0074568 A1 Mar. 25, 2010

Related U.S. Application Data

(63) Continuation of application No. PCT/JP2008/001339, filed on May 29, 2008.

(30) Foreign Application Priority Data

Jun. 1, 2007 (JP) .................................. 2007-147374

(51) Int. Cl.
*F16C 19/38* (2006.01)
*F16D 3/223* (2011.01)

(52) U.S. Cl. ........ 384/544; 384/480; 384/489; 384/589; 464/178

(58) Field of Classification Search .................. 384/477, 384/480, 448, 484, 481, 489, 512, 544, 589; 464/145, 178, 906
See application file for complete search history.

(56) References Cited

U.S. PATENT DOCUMENTS

| | | | | |
|---|---|---|---|---|
| 5,242,229 A | * | 9/1993 | McLarty | 384/484 |
| 5,674,011 A | * | 10/1997 | Hofmann et al. | 384/448 |
| 5,853,250 A | * | 12/1998 | Krude et al. | 384/544 |
| 6,135,571 A | * | 10/2000 | Mizukoshi et al. | 384/544 |
| 6,193,419 B1 | * | 2/2001 | Krude et al. | 384/544 |
| 6,354,952 B1 | * | 3/2002 | Boulton et al. | 464/145 |
| 6,464,399 B1 | * | 10/2002 | Novak et al. | 384/477 |
| 6,749,517 B2 | * | 6/2004 | Ouchi | 464/178 |
| 6,786,644 B2 | * | 9/2004 | Vignotto et al. | 384/484 |
| 7,104,893 B2 | * | 9/2006 | Ouchi et al. | 464/906 |
| 7,758,432 B2 | * | 7/2010 | Arrieta et al. | 464/178 |
| 7,850,531 B2 | * | 12/2010 | Brunetti et al. | 464/178 |
| 2006/0223643 A1 | * | 10/2006 | Arrieta et al. | 464/145 |

FOREIGN PATENT DOCUMENTS

| | | |
|---|---|---|
| CN | 1856662 | 11/2006 |
| EP | 1 526 297 | 4/2005 |
| JP | 2003-097588 | 4/2003 |
| JP | 2003-136908 | 5/2003 |
| JP | 2006-275174 | 10/2006 |
| JP | 2007-508986 | 4/2007 |
| WO | WO2005/050044 | 6/2005 |

* cited by examiner

*Primary Examiner* — Marcus Charles
(74) *Attorney, Agent, or Firm* — Harness, Dickey & Pierce, P.L.C.

(57) ABSTRACT

A vehicle wheel bearing apparatus has an outer member, an inner member double row rolling elements, and a constant velocity universal joint. A wheel hub of the inner member and an outer joint member of the constant velocity universal joint are axially separably connected. The outer joint member shoulder portion abuts against a caulked portion of the wheel hub. A cap is interposed between the caulked portion and the shoulder portion. The cap is press-formed from a steel plate and has a surface roughness of 0.63 Ra or less.

9 Claims, 4 Drawing Sheets

[Fig 1]
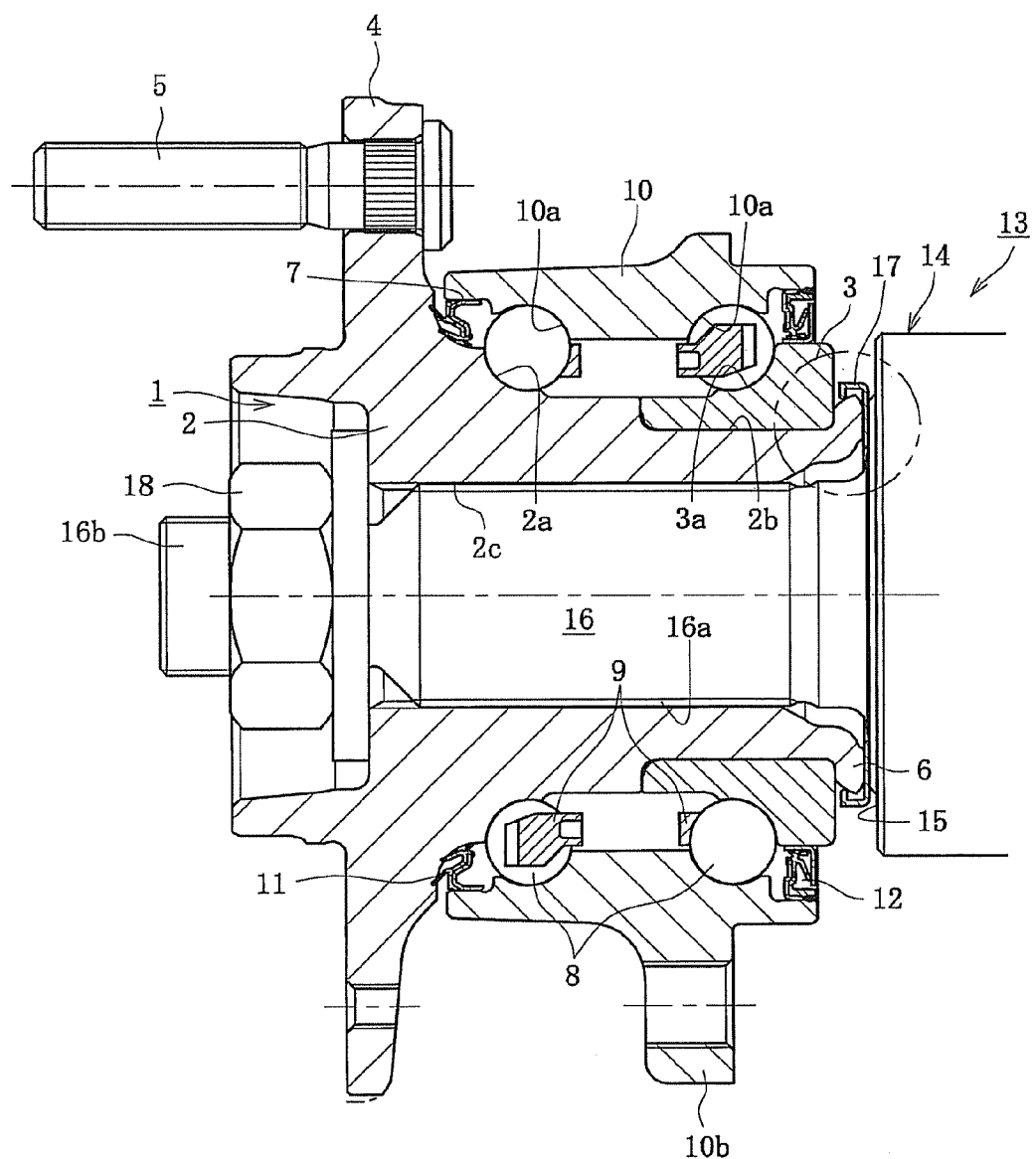

[Fig 2(a)]
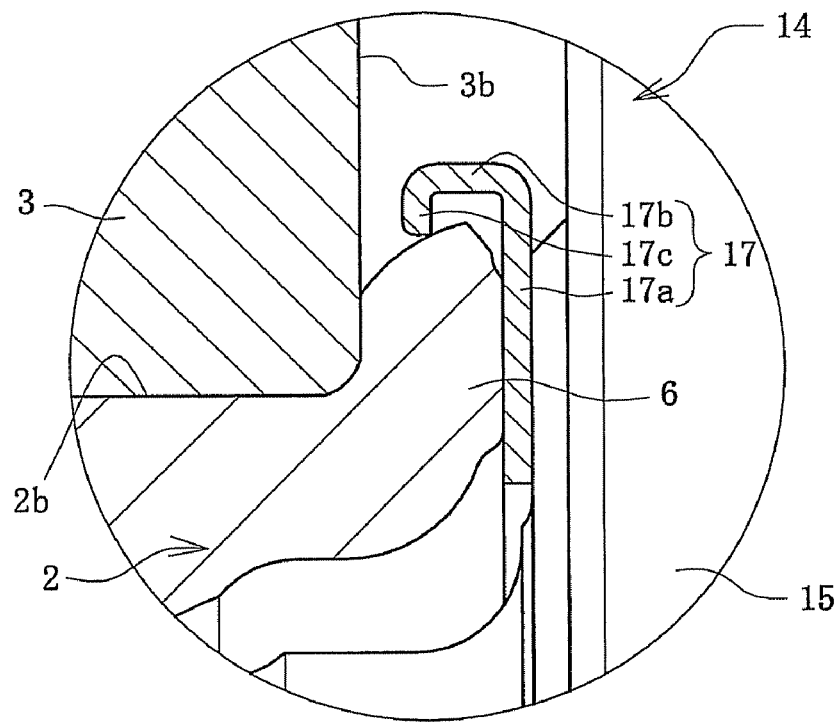
[Fig 2(b)]
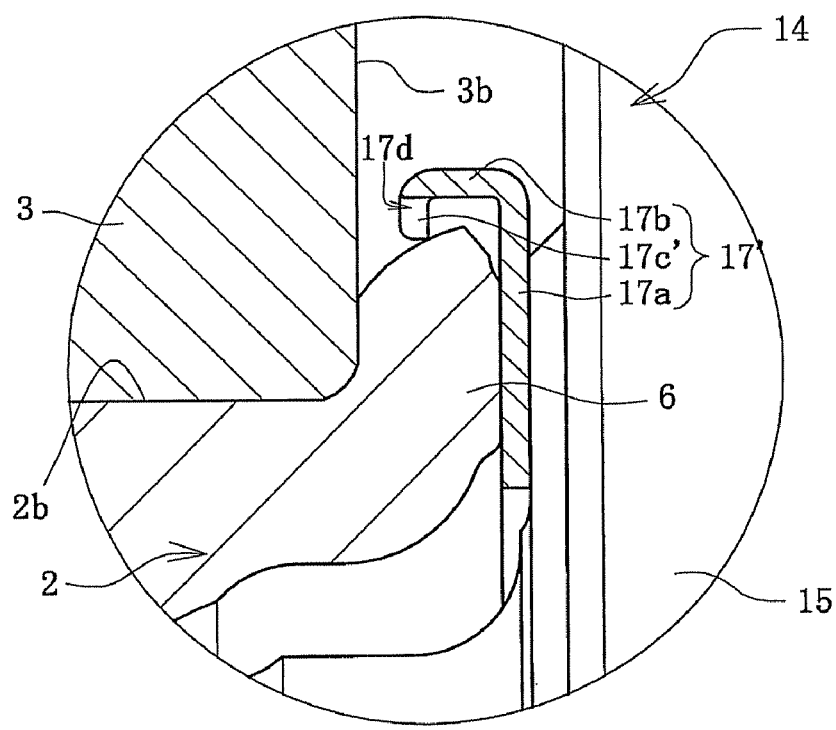

[Fig 3]
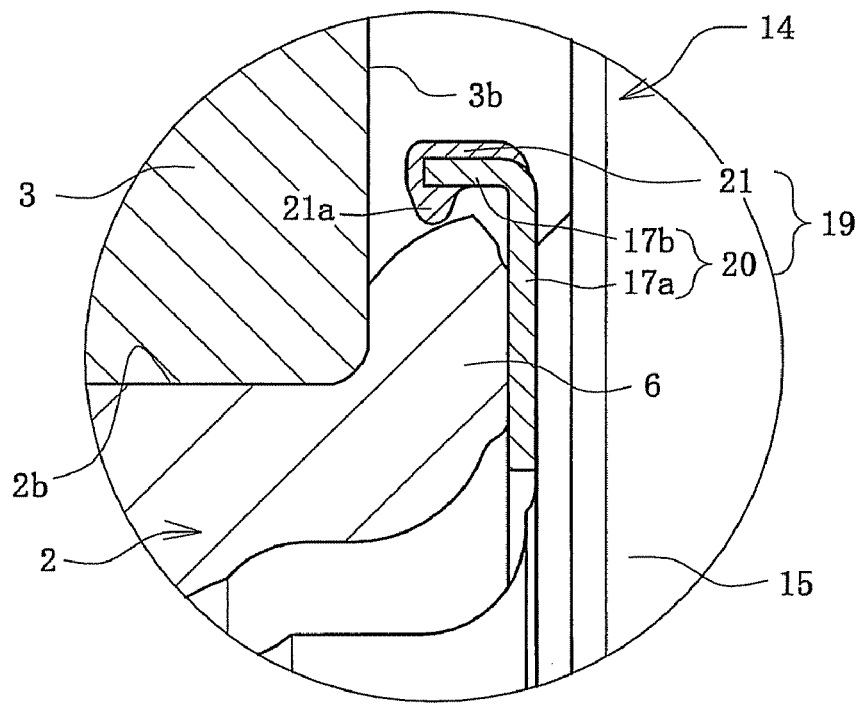
[Fig 4]
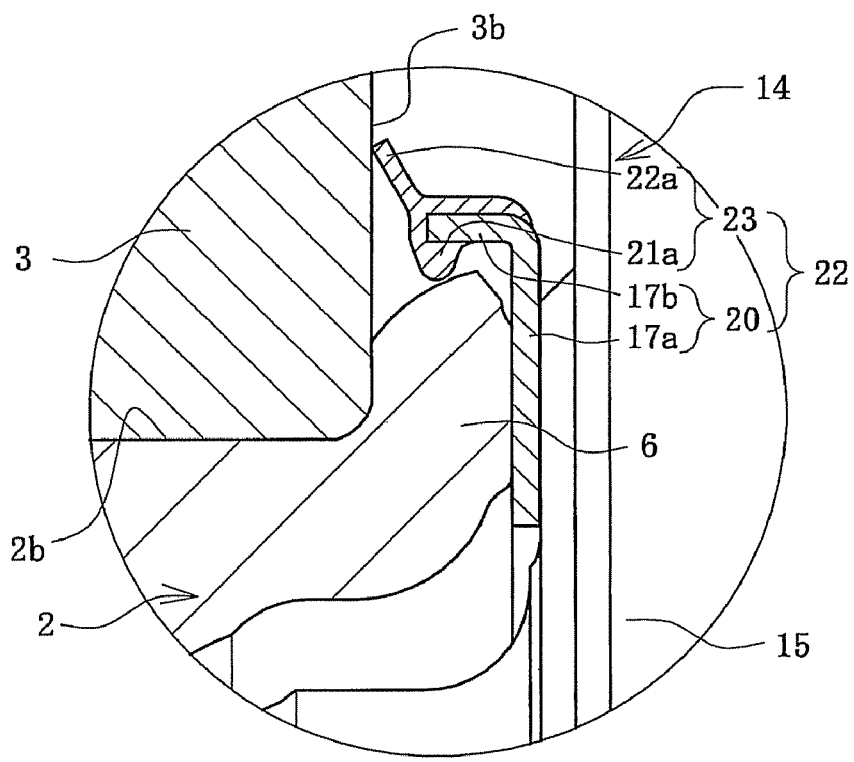

[Fig 5]
PRIOR ART
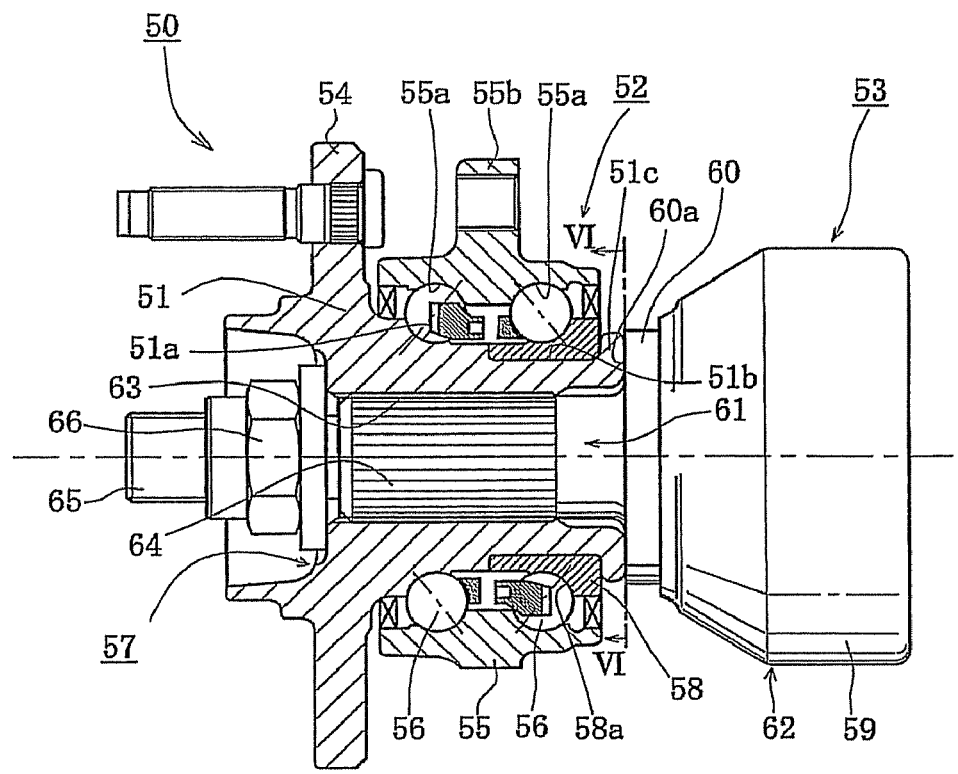
[Fig 6]
PRIOR ART
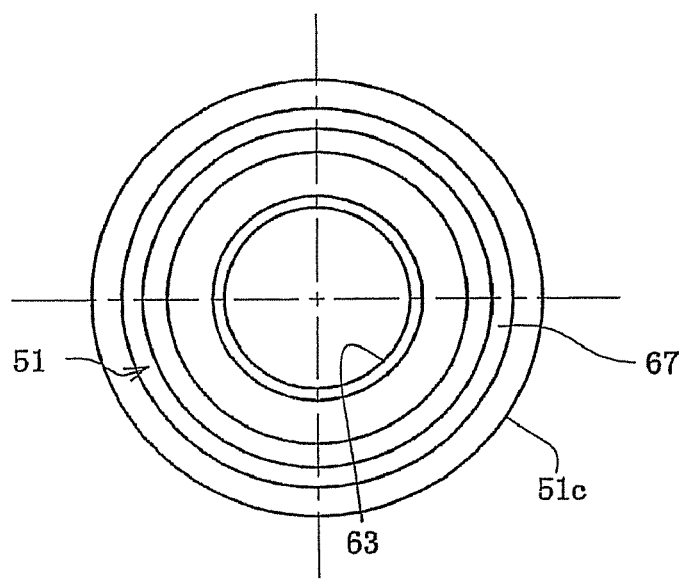

WHEEL BEARING APPARATUS FOR A VEHICLE

CROSS-REFERENCE TO RELATED APPLICATIONS

This application is a continuation of International Application No. PCT/JP2008/001339, filed May 29, 2008, that claims priority to Japanese Application No. 2007-147374, filed Jun. 1, 2007. The disclosures of the above applications are incorporated herein by reference.

FIELD

The present disclosure relates to a vehicle wheel bearing apparatus that supports a wheel of a vehicle such as an automobile and, more particularly, to a wheel bearing apparatus that rotatably supports a driving wheel (front wheel of an FF vehicle, a rear wheel of an FR or RR vehicle and whole wheels of 4WD vehicle) mounted on an independent suspension relative to the suspension apparatus.

BACKGROUND

In a power transmitting apparatus that transmits power from an engine of a vehicle, such as an automobile, to its wheels, it is necessary not only to transmit the power from the engine to the wheels, but to allow radial and axial displacements as well as moment displacements from the wheels caused by bounds or turns of the vehicle during running on a rough road. Accordingly, the power transmitting apparatus is connected to the driving wheel via a wheel bearing apparatus that includes a constant velocity universal joint. One end of a drive shaft arranged, between an engine side and the driving wheel side, is connected to a differential gear unit via a constant velocity universal joint of a sliding type. The other end of the drive shaft is connected via a secured type constant velocity universal joint.

Various types of wheel bearing apparatus have been previously proposed, for example, as shown in FIG. 5. The wheel bearing apparatus 50 includes a wheel hub 51 that mounts a wheel (not shown). A double row rolling bearing 52 rotatably supports the wheel hub 51. A secured type constant velocity universal joint 53, for transmitting power of a drive shaft (not shown), is secured with the to the wheel hub 51.

The wheel hub 51 is integrally formed at one end with a wheel mounting flange 54 to mount a wheel. The wheel hub outer circumference includes one inner raceway surface 51a. A cylindrical portion 51b axially extends from the inner raceway surface 51a. The double row rolling bearing 52 includes an outer member 55 and an inner member 57. The outer member 55 is integrally formed with a body mounting flange 55b to be mounted on a suspension apparatus (not shown). The outer member inner circumference is formed with double row outer raceway surfaces 55a, 55a. The inner member 57 is inserted into the outer member 55, via double row balls 56, 56.

The inner member 57 includes the wheel hub 51. An inner ring 58 is inserted onto the cylindrical portion 51b of the wheel hub 51. The inner ring outer circumference includes the other inner raceway surface 58a. The inner ring 58 is axially secured relative to the wheel hub 51 by a caulked portion 51c. The caulked portion is formed by plastically radially outwardly deforming an end of the cylindrical portion 51b of the wheel hub 51.

The constant velocity universal joint 53 includes an outer joint member 62 including an integrally formed cup shaped mouth portion 59. A shoulder portion 60 forms a bottom of the mouth portion 59. A shaft portion 61 axially extends from the shoulder portion 60. The outer joint member 62 is inserted into the wheel hub 51 in a torque transmittable fashion. A female serration 63 is formed on the inner circumference of the wheel hub 51. A male serration 64 is formed on the outer circumference of a shaft portion 61 of the outer joint member 62. The female and male serrations 63, 64 are mated with each other. The shaft portion 61 is fit into the wheel hub 51 until the shoulder portion 60 abuts against the caulked portion 51c of the wheel hub 51. Finally, a securing nut 66 is fastened onto an outer thread 65, formed on an end of the shaft portion 61, by a predetermined fastening torque to axially separably connect the wheel hub 51 and the outer joint member 62.

It is known that a large torque is transmitted from an engine to a wheel, via a sliding type constant velocity universal joint (not shown), during a low engine speed range such as during starting of a vehicle. Thus, a torsional deformation is caused in the drive shaft. As a result, torsional deformation is also caused in the inner ring 57 of the double row rolling bearing 52 that supports the drive shaft. When a large torsional deformation is caused in the drive shaft, a so-called "stick-slip noise" is generated by a sudden slip between abutting surfaces of the outer joint member 62 and the inner member 57.

To cope with this problem in the prior art wheel bearing apparatus 50, the caulked portion 51c of the wheel hub 51, against which the shoulder portion 60 of the outer joint member 62 abuts, is formed as a flat surface. A circular recessed groove 67 is formed on the flat surface of the caulked portion 51c at a radially middle portion of the flat surface, as shown in FIG. 6. The groove 67 is filled with grease. This makes it possible to reduce the surface pressure applied to the caulked portion 51c by a fastening force of the securing nut 66. Accordingly, it is possible to prevent plastic deformation of the caulked portion 51c and loosening of the securing nut 66 and to reduce the coefficient of friction of the abutted surfaces owing to the grease. Thus, it is possible to reduce frictional energy at the abutted surfaces and to prevent the generation of the stick-slip noise that is caused by a sudden slip at the abutted surfaces between the shoulder portion 60 and the caulked portion 51c. Reference Patent Document 1: Japanese Laid-open Patent Publication No. 136908/2003

However, in the prior art wheel bearing apparatus, an additional machining step is required to form the recessed groove 67 on the flat surface of the caulked portion 51c. Thus, it is believed that it would not only increase the manufacturing cost but reduce the strength of the caulked portion 51c. In addition, grease contained in the recessed groove 67 of the caulked portion 51c tends to leak out during running of the vehicle. Thus, it is difficult to prevent the generation of a stick-slip noise for a long term.

SUMMARY

It is, therefore, an object of the present disclosure to provide a wheel bearing apparatus for a vehicle that can reduce the sudden slip between the caulked portion and the shoulder portion of the outer joint member. Thus, it can prevent the generation of the stick-slip noise for a long term.

To achieve the object, a vehicle wheel bearing apparatus comprises an outer member integrally formed with double row outer raceway surfaces on its inner circumference. An inner member includes a wheel hub and at least one inner ring. The wheel hub is integrally formed at one end with a wheel mounting flange. A cylindrical portion is on its other end. The inner ring is press fit onto the cylindrical portion of the wheel hub. The inner member includes double row inner raceway surfaces arranged opposite to the double row outer raceway surfaces. Double row rolling elements are rollably contained between the double row inner and outer raceway surfaces of the inner member and the outer member. A constant velocity universal joint is connected to the wheel hub. The inner ring is axially immovably secured relative to the wheel hub by a caulked portion. The caulked portion is formed by plastically deforming radially outward an end of the cylindrical portion. An outer joint member of the constant velocity universal joint includes an integrally formed cup shaped mouth portion. A shoulder portion is formed at a bottom of the mouth portion. A stem portion is fit into the wheel hub to provide torque transmittably to each other via serrations. The wheel hub and the outer joint member are axially separably connected. The shoulder portion abuts against the caulked portion. A cap is interposed between the caulked portion and the shoulder portion. The cap is press-formed from a steel plate and has its surface roughness of 0.63 Ra or less.

In the vehicle wheel bearing apparatus, a stem portion is fit into the wheel hub for torque transmission between each other, via serrations. The wheel hub and the outer joint member are axially separably connected. The shoulder portion abuts against the caulked portion. A cap is interposed between the caulked portion and the shoulder portion. The cap is press-formed from a steel plate and has its surface roughness of 0.63 Ra or less. The cap will be instantaneously dragged by either one of the caulked portion or the shoulder portion of the outer joint member prior to their rotation even if a large torque is applied to a drive shaft and a large torsional deformation is caused in the outer joint member. Accordingly, it is possible to suppress wear of the caulked portion due to reduction of the coefficient of friction between the abutted surfaces. Also, it is possible to prevent the generation of the stick-slip noise due to suppression by the cap of the sudden slip generated between the caulked portion and the shoulder portion.

A radially inwardly extending anchoring portion is integrally formed on the outer circumferential portion of the cap. The inner diameter of the anchoring portion is slightly smaller than the outer diameter of the caulked portion. The cap can be mounted on the caulked portion by elastically deforming the anchoring portion. This prevents the cap from slipping off of the caulked portion during assembly of the wheel bearing apparatus.

The outer circumferential portion of the cap is formed with axially extending slits. This improves the ease of assembly of the cap due to easy elastic deformation of the anchoring portion of the cap without strict limitation on the dimension of the anchoring portion.

The cap has a synthetic resin sealing member integrally adhered to the circumferential portion of the cap via vulcanized adhesion. The sealing member has an anchoring portion. The inner diameter of the anchoring portion is slightly smaller than the outer diameter of the caulked portion. Thus, the cap can be mounted on the caulked portion by elastically deforming the anchoring portion. This improves the ease of assembly of the cap due to easier elastic deformation of the anchoring portion of the cap. Also, it prevents the cap from slipping off of the caulked portion during assembly of the wheel bearing apparatus.

A labyrinth structure, formed by a slight axial gap, is formed between the cap and a larger end face of the inner ring. This prevents entry of foreign matter such as rainwater or dusts into the caulked portion. Also, it prevents the generation of corrosion in the caulked portion to improve the durability of the wheel bearing apparatus.

The sealing member has an integrally formed side lip that elastically contacts the larger end face of the inner ring. This prevents entry of foreign matter such as rainwater or dusts into the caulked portion.

The cap is formed from a steel plate with corrosion resistance. This prevents the generation of corrosion for a long term. Thus, this improves the durability of the wheel bearing apparatus.

Low friction coating is formed on the surface of the cap. This further reduces the coefficient of friction on the abutted surfaces. Thus, this prevents the generation of the stick-slip noise and suppresses wear of the cap itself.

The vehicle wheel bearing apparatus comprises an outer member integrally formed with double row outer raceway surfaces on its inner circumference. An inner member includes a wheel hub and at least one inner ring. The wheel hub is integrally formed at one end with a wheel mounting flange. Its other end includes a cylindrical portion. The inner ring is press fit onto the cylindrical portion of the wheel hub. The inner member is formed with double row inner raceway surfaces arranged opposite to the double row outer raceway surfaces. Double row rolling elements are rollably contained between the double row inner and outer raceway surfaces of the inner member and the outer member. A constant velocity universal joint is connected to the wheel hub. The inner ring is axially immovably secured relative to the wheel hub by a caulked portion. The caulked portion is formed by plastically deforming an end of the cylindrical portion radially outward. An outer joint member of the constant velocity universal joint includes an integrally formed cup shaped mouth portion. A shoulder portion forms a bottom of the mouth portion. A stem portion is fit into the wheel hub for torque transmittably between each other via serrations. The wheel hub and the outer joint member are axially separably connected. The shoulder portion abuts against the caulked portion. A cap is interposed between the caulked portion and the shoulder portion. The cap is press-formed from a steel plate and has a surface roughness of 0.63 Ra or less. Wear of the caulked portion can be suppressed with the coefficient of friction of the abutted surfaces being reduced. The sudden slip caused between the caulked portion and the shoulder portion can be reduced. Thus, the generation of the stick-slip noise can be prevented. This is because the cap is instantaneously dragged by either one of the caulked portion or the shoulder of the outer joint member prior to their rotation.

A vehicle wheel bearing apparatus comprises an outer member integrally formed with a body mounting flange on its outer circumference. Its inner circumference includes double row outer raceway surfaces. An inner member includes a wheel hub and an inner ring. The wheel hub is integrally formed at one end with a wheel mounting flange. The wheel hub outer circumference includes one inner raceway surface that corresponds to one of the outer raceway surfaces. The other end of the wheel hub includes a cylindrical portion. The inner ring is press fit onto the cylindrical portion of the wheel hub. The inner ring is formed with the other inner raceway surface that corresponds to the other of the double row outer raceway surfaces. Double row rolling elements are rollably contained between the double row inner and outer raceway surfaces of the inner member and the outer member. A constant velocity universal joint is connected to the wheel hub. The inner ring is axially immovably secured relative to the wheel hub by a caulked portion. The caulked portion is formed by plastically deforming an end of the cylindrical portion radially outward. An outer joint member of the constant velocity universal joint includes an integrally formed cup shaped mouth portion. A shoulder portion forms a bottom of the mouth portion. A stem portion is fit into the wheel hub to transmit torque to each other via serrations. The wheel hub and the outer joint member are axially separably connected. The shoulder portion abuts against the caulked portion. A cap is interposed between the caulked portion and the shoulder portion. The cap is press-formed from a steel plate and has its surface roughness of 0.63 Ra or less. A radially inwardly extending anchoring portion is integrally formed on the outer circumferential portion of the cap. The inner diameter of the anchoring portion is slightly smaller than the outer diameter of the caulked portion. The cap can be mounted on the caulked portion by elastically deforming the anchoring portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of the vehicle wheel bearing apparatus.

FIG. 2(a) is a partially enlarged view of FIG. 1.

FIG. 2(b) is a partially enlarged view of a modification of FIG. 2(a).

FIG. 3 is a partially enlarged view of a second embodiment of the vehicle wheel bearing apparatus.

FIG. 4 is a partially enlarged view of a modification of the cap of FIG. 3.

FIG. 5 is a longitudinal section view of a prior art vehicle wheel bearing apparatus.

FIG. 6 is a side elevation view taken along a line VI-VI of FIG. 5.

DETAILED DESCRIPTION

Preferred embodiments of the present disclosure will be hereinafter described with reference to the drawings.

FIG. 1 is a longitudinal section view of a first embodiment of the vehicle wheel bearing apparatus. FIG. 2(a) is a partially enlarged view of FIG. 1. FIG. 2(b) is a partially enlarged view of a modification of FIG. 2(a). In the description below, the term "outer side" of the apparatus denotes a side that is positioned outside of the vehicle body (left-side in a drawing). The term "inner side" of the apparatus denotes a side that is positioned inside of the body (right-side in a drawing) when the bearing apparatus is mounted on the vehicle body.

The vehicle wheel bearing apparatus of the present disclosure is a third generation type used for a driving wheel. It includes an inner member 1, an outer member 10, and double row rolling elements (balls) 8, 8 rollably contained between the inner and outer members 1, 10. A constant velocity universal joint 13 is separably connected to the apparatus. The inner member 1 includes a wheel hub 2 and an inner ring 3 secured onto the wheel hub 2.

The wheel hub 2 is integrally formed with a wheel mounting flange 4 at one end. One (outer side) inner raceway surface 2a is on the wheel hub outer circumference. A cylindrical portion 2b axially extends from the inner raceway surface 2a. A serration (or spline) 2c is on the wheel hub inner circumference. Hub bolts 5 are arranged on the wheel mounting flange 4 equidistantly along the periphery of the wheel mounting flange 4.

The wheel hub 2 is made of medium/high carbon steel including carbon of 0.40-0.80% by weight such as S53C. It is hardened by high frequency induction quenching so that a region from an inner side base 7 of the wheel mounting flange 4, forming a seal-land portion where an outer side seal 11 is in sliding contact, to the cylindrical portion 2b is hardened to have a surface hardness of 58-64 HRC.

The inner ring 3 is formed with the other (inner side) inner raceway surface 3a on its outer circumference. The inner ring 3 is press-fit onto the cylindrical portion 2b of the wheel hub 2, via a predetermined interference. The inner ring 3 is axially immovably secured by a caulked portion 6. The caulked portion 6 is formed by plastically deforming the end of the cylindrical portion 2b radially outward. The end face of the caulked portion 6 is formed as a flat surface so as to reduce the surface pressure applied to the caulked portion by an axial force. Thus, this reduces a plastic deformation and wear of the caulked portion 6.

The inner ring 3 and balls 8 are made of high carbon chrome steel such as SUJ2. They are hardened to their core by dip quenching to have a surface hardness of 58~64 HRC.

The outer member 10 is integrally formed with a body mounting flange 10b on its outer circumference. The body mounting flange 10b is to be mounted on a body of a vehicle (not shown). The outer member inner circumference has double row outer raceway surfaces 10a, 10a opposite to the inner raceway surfaces 2a, 3a of the inner member 1. The outer member 10 is made of medium/high carbon steel including carbon of 0.40~0.80% by weight such as S53C. The double row outer raceway surfaces 10a, 10a are hardened by high frequency induction quenching to have a surface hardness of 58~64 HRC.

The double row balls 8, 8 are contained between the outer and inner raceway surfaces 10a, 2a and 10a, 3a of the outer member 10 and the inner member 1. They are rollably held by cages 9, 9.

Seals 11, 12 are mounted within annular openings formed between the outer member 10 and the inner member 1. The seals 11, 12 prevent leakage of grease contained in the bearing and the entry of rainwater and dusts into the bearing from the outside.

Although it is shown herein as a double row angular contact ball bearing using balls as the rolling elements 8, the present disclosure is not limited to such a bearing. It may be applied to a double row tapered roller bearing using tapered rollers as the rolling elements 8. In addition although the structure shown here is a so-called third generation type bearing structure, the present wheel bearing apparatus is not limited to such a structure. It may be applied to bearing structures of a so-called first or second generation type where a pair of inner rings is press-fit onto a cylindrical portion of a wheel hub.

The constant velocity universal joint 13 includes an outer joint member 14, a joint inner ring, a cage and torque transmitting balls (not shown). The outer joint member 14 is made of medium/high carbon steel including carbon of 0.40~0.80% by weight such as S53C. The outer joint member 14 includes an integrally formed cup shaped mouth portion (not shown). A shoulder portion 15 forms a bottom of the mouth portion. A stem portion 16 axially extends from the shoulder portion 15. The stem portion 16 is formed with a serration (or spline) 16a on its outer circumference. The serration (or spline) 16a engages a serration 2c of the wheel hub 2. The end of the stem portion 16 includes an outer thread (male thread) 16b. The stem portion 16 of the outer joint member 14 is inserted into the wheel hub 2 until the shoulder portion 15 abuts against the caulked portion 6, via a cap 17 later described. Finally a securing nut 18 is fastened onto the outer thread 16b at a predetermined fastening torque. The wheel hub 2 and the outer joint member 14 are axially separably connected to each other.

The cap 17 is mounted on the caulked portion 6. The cap 17 is press-formed from a steel plate with corrosion resistance, such as preserved cold rolled steel sheet (JIS SPCC etc.) or austenitic-stainless steel sheet (JIS SUS 304 etc.). The cap 17 has a substantially L-shaped cross-section. The surface roughness of steel plate forming the cap is set at 0.63 Ra or less, preferably at 0.3 Ra or less. "Ra" is one of the surface roughness parameter of JIS (JIS B0601-1994) and means an arithmetical average roughness that is an average value of absolute value deviation from an average line.

As shown in the partially enlarged view of FIG. 2(a), the cap 17 includes a disk shaped abutting portion 17a, a cylindrical portion 17b and an anchoring portion 17c. The cylindrical portion 17b axially extends from a radially outermost portion of the abutting portion 17a. The anchoring portion 17c is bent radially inward from the end of the cylindrical portion 17b. The inner diameter of the cap anchoring portion 17c is set slightly smaller than the outer diameter of the caulked portion 6. The cap anchoring portion 17c is adapted to be mounted on the caulked portion 6 by elastically deforming the anchoring portion 17c. The cap 17 is opposed to the larger end face 3b of the inner ring 3 and leaves an axial gap of a maximum of 1 mm to form a labyrinth structure. This enables one-touch mounting of the cap 17 onto the caulked portion 6. Thus, this prevents the cap 17 from slipping off from the caulked portion 6 during the assembling steps. In addition, the labyrinth structure prevents entry of rainwater or dusts etc. into the caulked portion 6. Thus, this prevents the generation of corrosion in the caulked portion 6 and improves the durability of the wheel bearing, apparatus.

As shown in FIG. 2(b), axially extending slits 17d may be formed in the radially outer portion from the cylindrical portion 17b to the anchoring portion 17c' of the cap 17'. Thus, the elastic deformation of the anchoring portion 17c' can be easily achieved without strictly limiting the dimension of the anchoring portion 17c'. Accordingly, easy assembly of the cap 17' can be achieved.

Generation of the stick-slip noise will be more effectively prevented due to reduction of the coefficient of friction if a low friction coating is formed on the surface of the cap 17. The low friction coating may be formed by melting the surface layer of the material forming the cap 17, and providing a lubricant powder, such as molybudenum disulfide ($MS_2$) or PTFE (polytetrafluoroethylene) into a depth of several μm of the surface layer. Recrystallization and diffusion osmosis are then performed to the cap 17. This makes it possible to suppress wear of the cap 17 itself and to prevent extinction of the low friction coating due to the engraving phenomenon even if the surface of the cap 17 is worn. Thus, the low friction coating can be assured for a long term.

The metal cap 17 is mounted on the caulked portion 6. The wheel hub 2 and the outer joint member 14 are axially separably connected. The caulked portion 6 and the shoulder portion 15 abut each other, via the cap 17. Thus, the cap is instantaneously dragged by either the caulked portion 6 or the shoulder 15 of the outer joint member 14 prior to their rotation even if a large torque is applied to a drive shaft (not shown) and a large torsional deformation is caused in the outer joint member 14. Accordingly, it is possible to suppress wear of the caulked portion 6 due to reduction of the coefficient of friction between the abutted surfaces. Also, it is possible to prevent the generation of the stick-slip noise due to suppression by the cap 17 of the sudden slip generated between the caulked portion 6 and the shoulder portion 15.

FIG. 3 is a partially enlarged view of a second embodiment of the vehicle wheel bearing apparatus. The second embodiment is basically the same as the first embodiment only differing in the structure of the cap. Accordingly, the same reference numerals are also used in this embodiment to designate the same portions, same parts or same functions as those in the first embodiment and detail description of them will be omitted.

In this embodiment, a cap 19 is press-formed from a steel plate with corrosion resistance. The cap 19 has a substantially L-shaped cross-section. The cap 19 includes a metal core 20 that includes the disk shaped abutting portion 17a and the cylindrical portion 17b. The cylindrical portion 17b axially extends from a radially outermost portion of the abutting portion 17a. A sealing member 21, formed from synthetic rubber such as nitrile rubber, is integrally adhered to the metal core 20 via vulcanized adhesion. The sealing member 21 is adhered to the cylindrical portion 17b of the metal core 20. The sealing member 21 has an integrally formed anchoring portion 21a that projects radially inward. The inner diameter of the anchoring portion 21a of the cap 19 is set slightly smaller than the outer diameter of the caulked portion 6. The sealing member 21 opposes the larger end face 3b of the inner ring 3 and leaves an axial gap of a maximum of 1 mm to form a labyrinth structure. This enables one-touch mounting of the cap 19 onto the caulked portion 6 by elastically deforming the anchoring portion 21a of the sealing member 21. Thus, this prevents the cap 19 from slipping off from the caulked portion 6 during the assembling step. In addition, the labyrinth structure prevents entry of rainwater or dusts etc. into the caulked portion 6. Thus, this prevents the generation of corrosion in the caulked portion 6 and improves the durability of the wheel bearing apparatus.

Similar to the first embodiment, the caulked portion 6 and the shoulder portion 15 of the outer joint member 14 do not directly contacted each other. The cap 19 can be slightly moved after a delay of the movement of any one of the caulked portion 6 and the outer joint member 14. Thus, it is possible to suppress the sudden slip between the caulked portion 6 and the shoulder portion 15 of the outer joint member 14. Thus, this prevents the generation of the stick-slip noise and also wear of the caulked portion 6 is suppressed.

FIG. 4 is a partially enlarged view of a modification of the cap of FIG. 3. A cap 22 includes the metal core 20 and a sealing member 23 integrally adhered to the metal core 20, via vulcanized adhesion. The sealing member 23 is adhered to the cylindrical portion 17b of the metal core 20. A side lip 22a elastically contacts the larger end face 3b of the inner ring 3, via a predetermined interference. The side lip 22a is integrally formed with the anchoring portion 21a that projects radially inward.

Similar to the second embodiment, the caulked portion 6 and the shoulder portion 15 of the outer joint member 14 are not in direct contact with each other due to the presence of the cap 22. The cap 22 can be slightly moved after a delay of the movement of any one of the caulked portion 6 and the outer joint member 14. Thus, it is possible to suppress the sudden slip between the caulked portion 6 and the shoulder portion 15 of the outer joint member 14. Thus, this prevents the generation of the stick-slip noise and also wear of the caulked portion 6 is suppressed. In addition, the side lip 22a prevents entry of rainwater or dusts, etc. into the caulked portion 6.

Thus, this prevents the generation of corrosion in the caulked portion 6 and improves the durability of the wheel bearing apparatus.

The present disclosure can be applied to a wheel bearing apparatus of any one of the first through third generation types that include an inner member with a wheel hub and an inner ring and a constant velocity universal joint. The inner member and an outer joint member of the constant velocity universal joint are separably connected while abutting each other.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member integrally formed with double row outer raceway surfaces on its inner circumference;
   an inner member including a wheel hub and at least one inner ring, the wheel hub integrally formed at one end with a wheel mounting flange and with a cylindrical portion on its other end, the inner ring being press fit onto the cylindrical portion of the wheel hub, the inner member formed with double row inner raceway surfaces arranged opposite to the double row outer raceway surfaces;
   double row rolling elements are rollably contained between the double row inner and outer raceway surfaces of the inner member and the outer member;
   a constant velocity universal joint connected to the wheel hub;
   the inner ring is axially immovably secured relative to the wheel hub by a caulked portion, the caulked portion is formed by plastically deforming an end of the cylindrical portion radially outward;
   an outer joint member of the constant velocity universal joint includes an integrally formed shoulder portion and a stem portion fit into the wheel hub to transmit torque between each other via serrations, and the wheel hub and the outer joint member are axially separably connected, and the shoulder portion abuts against the caulked portion;
   a cap is interposed between the caulked portion and the shoulder portion, the cap is press-formed from a steel plate and has a surface roughness of 0.63 Ra or less; and
   a radially inwardly extending anchoring portion is unitarily formed on the outer circumferential portion of the cap, an inner diameter of the anchoring portion is slightly smaller than an outer diameter of the caulked portion, and the cap is mounted on the caulked portion by elastically deforming the anchoring portion so that the anchoring portion directly anchors onto the caulked portion.

2. The vehicle wheel bearing apparatus of claim 1, wherein a radially inwardly extending anchoring portion is integrally formed on the outer circumferential portion of the cap, an inner diameter of the anchoring portion is slightly smaller than an outer diameter of the caulked portion, and the cap is mounted on the caulked portion by elastically deforming the anchoring portion.

3. The vehicle wheel bearing apparatus of claim 2, where the outer circumferential portion of the cap is formed with axially extending slits.

4. The vehicle wheel bearing apparatus of claim 1, wherein the cap has a synthetic resin sealing member integrally adhered to a circumferential portion of the cap via vulcanized adhesion, the sealing member has an anchoring portion, an inner diameter of the anchoring portion is slightly smaller than an outer diameter of the caulked portion so that the cap can be mounted on the caulked portion by elastically deforming the anchoring portion.

5. The vehicle wheel bearing apparatus of claim 4, wherein the sealing member has an integrally formed side lip elastically contacting a larger end face of the inner ring.

6. The vehicle wheel bearing apparatus of claim 1, wherein a labyrinth structure, formed by a slight axial gap, is formed between the cap and a larger end face of the inner ring.

7. The vehicle wheel bearing apparatus of claim 1, wherein the cap is formed from a steel plate with corrosion resistance.

8. The vehicle wheel bearing apparatus of claim 1, wherein a low friction coating is formed on the surface of the cap.

9. A vehicle wheel bearing apparatus comprising:
   an outer member integrally formed with double row outer raceway surfaces on its inner circumference;
   an inner member including a wheel hub and at least one inner ring, the wheel hub integrally formed at one end with a wheel mounting flange and with a cylindrical portion on its other end, the inner ring being press fit onto the cylindrical portion of the wheel hub, the inner member formed with double row inner raceway surfaces arranged opposite to the double row outer raceway surfaces;
   double row rolling elements are rollably contained between the double row inner and outer raceway surfaces of the inner member and the outer member;
   a constant velocity universal joint connected to the wheel hub;
   the inner ring is axially immovably secured relative to the wheel hub by a caulked portion, the caulked portion is formed by plastically deforming an end of the cylindrical portion radially outward;
   an outer joint member of the constant velocity universal joint includes an integrally formed shoulder portion and a stem portion fit into the wheel hub to transmit torque between each other via serrations, and the wheel hub and the outer joint member are axially separably connected, and the shoulder portion abuts against the caulked portion;
   a cap is interposed between the caulked portion and the shoulder portion, the cap is press-formed from a steel plate and has a surface roughness of 0.63 Ra or less; and
   a radially inwardly extending anchoring portion is integrally formed on the outer circumferential portion of the cap, an inner diameter of the anchoring portion is slightly smaller than an outer diameter of the caulked portion, the cap is mounted on the caulked portion by elastically deforming the anchoring portion and the outer circumferential portion of the cap is formed with axially extending slits enabling easy assembly of the cap onto the caulked portion.

* * * * *